United States Patent [19]

Hirama et al.

[11] Patent Number: 4,868,711
[45] Date of Patent: Sep. 19, 1989

[54] MULTILAYERED CERAMIC CAPACITOR

[75] Inventors: Masahiro Hirama; Hiroaki Tanidokoro; Naoto Kitahara; Yoshinori Shinohara; Kazuyasu Hikita, all of Yokoze, Japan

[73] Assignee: Mitsubishi Mining and Cement Co. Ltd., Tokyo, Japan

[21] Appl. No.: 250,119

[22] Filed: Sep. 28, 1988

[30] Foreign Application Priority Data

Sep. 29, 1987 [JP] Japan .................................. 62-242764

[51] Int. Cl.[4] ............................................. H01G 4/12
[52] U.S. Cl. ..................................... 361/321; 29/25.42
[58] Field of Search .................... 252/62.2; 264/61, 63, 264/65; 501/134–139; 29/25.42; 174/68.5; 357/10; 361/328, 330, 306, 321

[56] References Cited

U.S. PATENT DOCUMENTS 3,549,415 12/1970 Capek et al. .................. 29/25.42 X
3,836,830 9/1974 Akopian et al. .................... 361/330
3,996,502 12/1976 Bratschun ....................... 361/321 F
4,027,209 5/1977 Maher ............................. 29/25.42 X
4,082,906 4/1978 Amin et al. ................. 361/321 C X

FOREIGN PATENT DOCUMENTS 47912 12/1979 Japan ........................... 361/321 CC Primary Examiner—Donald A. Griffin
Attorney, Agent, or Firm—Hoffman, Wasson, Fallow & Gitler

[57] ABSTRACT

A multilayered ceramic capacitor includes glass melted layers and adhering layers containing conductive patters in which the combination of two or more different species of dielectric materials are used for ceramic layers in the stack of the multilayered capacitor.

14 Claims, 3 Drawing Sheets

MULTILAYERED CERAMIC CAPACITOR

FIELD OF THE INVENTION

The present invention relates to multi-layered ceramic capacitor(s), and a method of the production of the same. Particularly, it relates to the structure of the multilayered ceramic capacitor(s) having inserting glass melted layer(s) and adhering layer(s) containing conductive pattern(s) in which the combination of two or more different species of dielectric materials is used for ceramic layers in the stack of the multilayered capacitor. That is, two or more ceramic species of ceramic layers different in dielectric properties are each other or alternatively stacked in the structure of the multilayered capacitor.

DESCRIPTION OF THE PRIOR ART

Recently, the miniaturization of the electronics device requires and advances the miniaturization of capacitors and circuitry, and then, a variety of techniques to produce miniatured multilayered ceramic capacitors have been proposed and used (see U.S. Pat. No. 4,082,906).

The prior art multi-layer ceramic capacitors have been produced mainly by the following two methods.

The first one of manufacturing multi-layered capacitors comprises preparing dielectric material paste consisting essentially of very finely divided ceramic particulate materials and organic binding agent(s), and conductive paste consisting essentially of very finely divided metal material and organic binding agent(s) homogeneously mixed with, and then, forming multiple layers comprising alternatively layered of ceramic paste material layers and conductive paste formed layers, then drying the formed multi-layered laminate, and firing and thus formed multi-layered laminate to form the sintered laminate capacitor.

The second one of manufacturing multi-layer capacitors comprises forming ceramic "green sheet" from dielectric material paste by a doctor blade techniques, and cutting into the desired shape and dimension of the sheet, and drying the ceramic green sheets, and then, applying a conductive paste on the surface of the sheet by a screen printing technique to form a conductive layer followed by drying, and piling up those ceramic sheets with conductive layer to form a stack of multi-layered, and then, heat sticking those layers. A stack of multiple layers of conductive material thin plates and dielectric material thin plates is fired to produce a multi-layered capacitor.

However, in those processes, the dielectric ceramic material plates with metal paste layers must be fired at the high temperature of 1,200° to 1,400° C. and therefore, the used metal is necessitated to have the characteristics of being inactive or inert even at the temperature of 1,200° to 1,400° C. and incapable of being oxidized at that temperature. The precious metals such as gold, palladium and platinum or the alloy thereof (that is inert to the used ceramic material and does not melt even at such temperature) must be used for forming the electrode in order to remain in conductive form while buried in the ceramic during the firing or sintering process. Those precious metals are relatively expensive and the multi-layer ceramic capacitors using those precious metals will increase the cost of the manufacture, and therefore, the reduction of the cost thereof is very difficult.

The capacitor in use for the high frequency circuit is also required to be miniatured because the electronic device has been developed and advanced in use for the high frequency circuit.

The dielectric constant of the ceramic layer used in a multilayered capacitor, and also the dielectric properties such as a temperature coefficient of dielectric constant of the ceramic layer have been controlled or adjusted by controlling the chemical composition of the starting materials for the ceramic layer and/or using additives to the composition of the ceramic layer. (See Japanese patent application laid open publication No. 205,906/1985)

SUMMARY OF THE INVENTION

With the foregoing considerations in mind, the present invention contemplates the provision of an improved multilayered ceramic capacitor having controlled dielectric properties, especially, controlled temperature coefficient of the dielectric constant.

It is an object of the present invention to provide a monolithic capacitor which can be adjusted in both of the total dielectric constant and the dielectric temperature coefficient by using the combination of two or more species of dielectric layers to be stacked in the structure of the multilayered capacitor.

It is another object of the present invention to resolve the problem of the prior art multilayered capacitor in that the dielectric properties of the multilayered capacitor can not be arbitrarily controlled nor determined.

It is further object of the present invention to provide the novel structure of the multilayered capacitor in which two or more species of dielectric layers are stacked on each other in the structure of the multilayered capacitor including the conductive layers for electroding or the glass material layers to bind the dielectric layers together.

It is more further object of the present invention to provide the multilayered capacitor in which the total dielectric constant and the total temperature coefficient of the multilayered capacitor can be controlled, and therefore, arbitrarily determined by combining two or more different dielectric materials of the dielectric layers, which produce two or more species of the layers different in the dielectric properties, and therefore, the total electrostatic capacity is resulted with zero or nearly zero of the change of the dielectric constant due to the temperature change.

It is the further object of the present invention to provide the structure of the multilayered capacitor with less or zero of the change of the dielectric properties even when the temperature changes.

It is the further object of the present invention to provide the structure of the multilayered capacitor, in which couples of metal layers in use for the electrodes of the capacitors are formed, each couple thereof sandwiching the glass layer, and are the same potential, the equivalent series resistance value being less in the high frequency.

The essence of our invention resides in the discovery that the total dielectric properties of the multilayered capacitor can be controlled or arbitrarily determined by using the combination of two or more species of the dielectric layers to be alternatively stacked in the structure of the multilayered capacitor, which species are different in dielectric properties, such as dielectric constant and temperature coefficient of the dielectric constant. The resulting multi-layered capacitor is strong and has useful electrical properties for all kinds of circuitry.

DETAILED DESCRIPTION OF PREFERRED EMBODIMENTS

Figure 1:
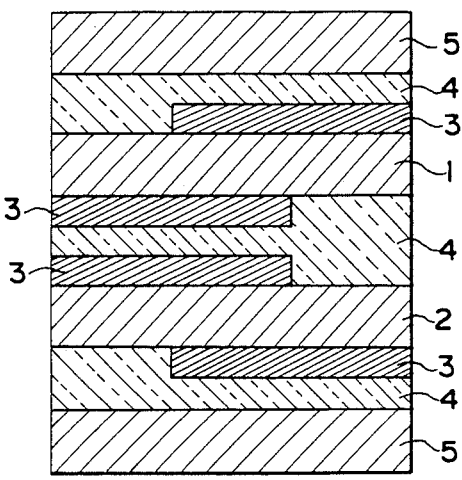
FIG. 1 illustrates schematically the section of one embodiment of the multilayered ceramic capacitor of the present invention in which ceramic layers 1 and 2 of two different dielectric properties, conductive material layers 3 and glass material layers 4 are piled, and cover ceramic films 5 are put on the top and bottom of the pile.

In accordance with the present invention, the novel structure of a monolithic ceramic capacitor can be produced, which comprises a plurality of ceramic fired thin film pieces and joining glass material layers interpositioning or lying between the ceramic thin film pieces, those ceramic film pieces and those joining glass material layers being alternatively piled to form a stack of ceramic plates and joining glass material layers, in that two or more species of dielectric layers made independently of dielectrically different materials are appropriately piled into the structure of multilayered capacitor by selecting the thickness of the formed layers to be stacked for each species of the layers, and the overlay area coverage of the electrodes formed on both side of each species of layers so as to control or arbitrarily determine the total dielectric constant of the stacked ceramic capacitor, and the total other dielectric properties of the multilayered capacitor. In that structure of the multilayered capacitor, the electrodes formed by a conductive material can be given patterns of inner electrode(s) and buried in the glass material layer, and therefore, do not have any open air (striped) inner electrodes. The joining glass material layer in general can be made from glass paste coated layer. Further, in a certain case, the conductive material layer can serve as a joining layer to join adjacent ceramic film pieces.

The process of manufacturing the inventive multilayered capacitor comprises selecting an appropriate combination of two or more dielectric materials having different dielectric properties, preparing independently each two or more different species of films from dielectrically different materials in combination, in predetermined thickness for each species of the films by firing, forming a conductive layer pattern for the inner electrodes in the predetermined overlay area coverage and glass paste layer each on both surfaces of the fired films, stacking the thus formed ceramic films, and putting each one ceramic thin film piece on the top surface of the stacks and the bottom surface of the stacks, and then firing the such stacked structure at the lower temperature to be cured and joined.

The gist of the present invention resides in a multilayered ceramic capacitor having alternative layers stacked of appropriately two or more species of the dielectric layers with the glass material layers and the conductive electrode, wherein a plurality of ceramic fired thin films in two or more species, in the predetermined thickness for each species, having conductive layers on both surfaces of each the ceramic film are joined in stack by imposing glass material joining layers between the ceramic fired films of the appropriate combination dielectric properties.

The said conductive material layer of the inventive capacitor may be made from a metal selected from the group consisting of silver, copper, palladium and the combination thereof. The inventive multilayered capacitor can be produced by forming a pattern of a conductive material layer in the predetermined overlay area coverage, on the both surfaces of the thin ceramic films that have been appropriately selected in combination of the appropriate dielectric properties, and have been independently and separately prepared with the predetermined thickness for each species of the films, by means of screen printing technique; then applying glass paste on both the thus formed surfaces of the ceramic films by means of the screen printing technique; then stacking a plurality of two or more species of the dielectrically different films in the predetermined thickness for each the species of films, having conductive layers in the predetermined overlay area coverage of the electrodes formed on both surfaces of the films, imposing such glass paste layer, and then subjecting the stacked structure to a heat treatment at a temperature in the range at that the glass paste layer can be melt to join or stick the ceramic thin films sandwiching the glass. The structure of the inventive multilayered ceramic capacitor is essentially consisting of ceramic thin films (or layers) of appropriate combination in dielectric properties, and joining glass layers, in that a plurality of ceramic films are stacked and joined imposing the joining layer, and the joining layer may be formed from a predetermined pattern of conductive material layer and glass material layer; or that either one or both of the glass layer and conductive layer functions to join or stock the ceramic layers. When the glass layer functions to join the ceramic layers, a plurality of the thin ceramic films can be stacked imposing the glass layer, and fired to melt the glass paste in the glass layer. When the conductive layer functions to join the ceramic thin layers, a conductive paste or conductive adhesive agent is used to be applied to the surface of the thin ceramic films, and the ceramic films are set to be joined.

In the inventive multilayered capacitor, because the fired ceramic films are used, the substrate or the structure of the stacked ceramic films is not deformed even through the heat treatment to melt the glass paste in the glass layer after the glass paste is applied to the surface of the thin ceramic films. Accordingly, there is no need of considering the shrinkage of the substrate, in designing the patterns of the inner electrodes in the capacitor. The inner electrodes can be correctly and accurately formed as compared with the prior art capacitor. Further, the thin ceramic films can rarely be bend backwards. In addition, a large number of the ceramic films can be stacked even being very thin.

In accordance with the present invention, the conductive patterns, or the inner electrodes are not exposed to the outer open air, and therefore, precious metal such as noble metal paste is not needed to form the inner electrodes. That means metal material other than noble metal material can be used to form the inner electrodes.

When the glass layer is used to join the ceramic films in the stack, glass paste is applied to the both surfaces of the ceramic films to form the glass paste layer by means of screen printing technique thereby to form a joining layer of the glass paste layer. Such structure of the stack is fired at the relatively low temperature so as to melt the glass paste layer to joint the ceramic films sandwiching the glass layers. The glass layer is formed over the whole surface of the ceramic film without any void nor space between the two layers (the two ceramic films), and therefore, the adhesive force produced by the joining glass layer is strong enough to join and bond tightly the two ceramic films. As a result the multilayered ceramic capacitor with the high strength can be produced. In those glass layers, conductive patterns are formed so as to form inner electrodes for the capacitor, which electrodes are incorporated in and/or among the glass layers, and therefore, is not exposed outside (to the air).

Because the inventive capacitor has the glass material layer as a joining layer, it gives good sealing ability and good insulating performance, that can provide an easy-handling capacitor. The glass material layers have excellent electric insulation, and then, the two conductive layers sandwiching the glass material layer, each of which is printed separately on the both surfaces of the different and adjoining ceramic films are kept in excellent insulation and further in good sealing.

Further, the ceramic films to be laminated are a fired thin plate or film, the margins to be used for positioning the electrode patterns formed on the ceramic film pieces can be narrower. Then, the accuracy of electrode pattern positioning can be easily attained. It enables to establish elaborate electrode pattern manufacture of the capacitor. The thickness of the ceramic films to be laminated is depending on the desired capacity and the dielectric properties such as dielectric constant and the temperature coefficient of the layer.

Such thin ceramic films enable the manufacture of the dielectric material with less dielectric loss, and further, facilitate the finely determining of the position of the electrode patterns formed on the ceramic film pieces because the fired ceramic films are so thin to be transparent in determining the position of the electrode patterns. In addition, the inventive structure of the capacitor can easily adjust the configuration of the ceramic layers to be used in the capacitor by removing easily the deformation of the fired thin films. The resulting capacitor has a highly flat surface. Therefore, the range of the preferable thickness of the fired ceramic films to be used in the capacitor is from 20 micrometer to 400 micrometer.

The capacitor of the present invention is in the structure in that a plurality of fired ceramic films are laminated with inserting glass material layers formed on the both surfaces of the ceramic films, forming inner electrode patterns on either of the surfaces of each ceramic films except on the top and bottom films.

Further, the structure of the invention capacitor will be better understood from the following description taken in conjunction with the accompanying drawings.

One embodiment of the inventive capacitor is shown in FIG. 1, wherein alumina film 1 having positive temperature coefficient of the dielectric constant, with electrodes 3 formed on both surfaces thereof, and strontium titanate film 2 having negative temperature coefficient of the dielectric constant, with electrodes 3 formed on both surfaces thereof are piled as shown in FIG. 1, and further, two alumina cover films 5 are positioned on the top surface and the bottom surface of the stacked structure of the alumina film 1 and the titanate film 2 so as to prevent exposure of glass material layers 4 to outside air of the multilayered capacitor as shown in FIG. 1.

Accordingly, the conductive material layer pattern 3, i.e. the inner electrode 3 is not exposed to outside nor air, and is enclosed in glass material layer 4. Therefore, the metal material constituting the inner electrode can be hardly oxidized and therefore, can be relatively freely selected from wide range of materials.

Metal with excellent conductivity is preferable for electrode of the capacitor to be used for high frequency circuit. For example, silver, silver-palladium and copper are preferable for material used in the electrode of the capacitor to be used for high frequency circuit. When such metals are used for the electrode patterns enclosed in the inventive capacitor, the resulting capacitor is excellent in performance and characteristics for high frequency range.

The method of producing the inventive capacitor is as follows. Each of two or more species of dielectric films having different dielectric properties to be stacked in accordance with the present invention is prepared by firing ceramic green sheet(s) made from desired dielectric material(s), and conductive material is applied to both surfaces of the fired ceramic films to form electrodes on both surfaces of the film. Concretely, conductive paste is applied to either surface of the fired ceramic films to form electrodes, and further, glass particle paste is applied to the whole surface including the electrodes of the ceramic films by screen printing technique, to form a glass paste layer on the whole surface of the ceramic films.

Two or more species of such films each with electrodes and glass paste layer are stacked (or laminated) and further, the ceramic films without any electrode layer an glass layer are positioned on the top and bottom of the stack to provide no exposure of the glass layer and electrode to outside air. At least one of the glass material layer and conductive material layer is used as a joining layer to join the dielectric layers. When the glass material layer is used as a joining layer, the stack of multiple layered ceramic films with electrode layers and glass material layer is fired at lower temperature to melt the glass material thereby joining the adjacent ceramic films sandwiching the corresponding glass layer. When the electrode layer is used as a joining layer, a conductive past and/or conductive binder is used to join the adjacent ceramic pieces together in the stack.

While two or more species of dielectric layers will produce the multilayered capacitor in accordance with the present invention, it is necessary to combined the material having positive temperature coefficient of the dielectric constant with the dielectric material having negative temperature coefficient of the dielectric constant as materials to form each two species of dielectric layers, so as to minimize the total temperature coefficient of the dielectric constant of the capacitor. There are listed as dielectric material having a positive temperature coefficient of the dielectric constant, alumina, mullite, steatite, forsterite, magnesium titanate, lead titanate.

And, there is listed as dielectric material having a negative temperature coefficient of the dielectric constant, titania, calcium titanate and strontium titanate. By selecting the appropriate combination of the dielectric materials from the above lists so as to minimize the total temperature coefficient of the multilayered capacitor, the multilayered capacitor can be produced in accordance with the present invention. In other words, the appropriate combination of two or more species of dielectric materials can be selected so as to compensate for the differing temperature coefficients of the stacked layers in both electrostatic capacity and/or dielectric properties, thereby controlling the electrostatic capacity and/or dielectric properties of the resulting multilayered capacitor.

All of the conventional compositions can be used to produce the appropriate combination of dielectric materials to minimize the total temperature coefficient of the dielectric constant in accordance with the present invention. For example, additional compounds such as calcium zirconate, strontium titanate, bismuth titanate, calcium stannate, bismuth stannate, bismuth zirconate, lead titanate, barium zirconate and the like can be added to the above dielectric material composition so as to change or control the electrical properties thereof. Further, many oxide compounds such as manganese oxide, silicon oxide, aluminium oxide, zirconium oxide, titanium oxide, cobalt oxide, nickel oxide and the like can be added to the above mentioned dielectric compositions so as to improve the sintering properties of the dielectric layers used in the capacitor of the present invention.

The starting material used for the production of dielectric films to be used for the inventive capacitor can be preferably prepared from metal alkoxide by sol-gel method. So thin films can be produced preferably from the metal alkoxide. The preparation from metal oxides can be used for the production of the dielectric layers to be used in the present invention.

The formation of the conductive material layer patterns is illustrated by printing methods, but among them, particularly the thick coating method is preferable. The photo-etching technique for thin coating production can be used for the formation of the conductive layer when the conductive layer is not as a joining layer.

The material used for the formation of conductive layer pattern may include gold, silver, copper, nickel, platinum, palladium, lead and the combination thereof. The paste of such materials is applied to the surfaces of the ceramic films to produce conductive patterns, that is, inner electrode patterns on the ceramic films. When the capacitor in use for high frequency circuit is desired, silver, gold, copper, palladium or the combination thereof should be used. In the structure of the inventive capacitor, relatively oxidizable metal such as nickel other than the conventional metal to be used for a multilayered capacitor can be used for the production of the conductive layer. The production of glass material layer can be carried out as above mentioned by a screen printing technique. The glass material to form the glass material layer is glass material that can be melt at relatively low temperature, such as boro-silicate glass, and crystallizable glass material. The glass material has preferably a melting point at low temperature, and is easily handled. In heat treatment to join the adjacent ceramic films, the glass material should be melt at the temperature as low as possible so as not to affect the stack of multilayered capacitor comprising an inner electrode. The temperature at which the stack is heated to melt the glass material and to join the adjacent ceramic layers is preferably 500° C. to 900° C. in order, and more preferably 700° C. to 850° C.

In use for high frequency circuitry, when material comprising as a major component, titania and barium titanate is used, the dielectric loss factor at high frequency current is as low as in order of $10^{-4}$, while the dielectric constant is several tens to thousands. On the other hand, when the material essentially consisting of alumina is used for the layers of the capacitor, the dielectric constant is as low as in order of ten, the thickness of the alumina layers must be so small that the required thin layer is impossible to make. The thinner the ceramic layer of the capacitor is, the better the high frequency characteristics of the resulting capacitor is, and the smaller the resulting capacitor is.

In accordance with the present invention, the lower dielectric loss factor can be attained with use of the material essentially consisting of alumina, which may contain $SiO_2$ and $MgO$ as a minor component. This means that the thickness of the dielectric layer in the capacitor is preferably less than 130 micrometer in accordance with the present invention.

Only illustration of the present invention, the combination of alumina film and strontium titanate film containing the other additives is described but it should not be interpreted for the limitation of the present invention.

In the inventive multilayered ceramic capacitor, at least two species of dielectric ceramic materials are used to make a stack of multilayered capacitor, one species of which dielectric materials has a positive temperature coefficient of dielectric constant, another species of which dielectric materials has a negative temperature coefficient of dielectric constant, so that the total temperature coefficient is controlled to be lesser or zero in the following way.

The dielectric constant C of the ceramic dielectric material used for the layer in the capacitor is;

$$C = \epsilon_0 \epsilon_S \cdot S/t \tag{1}$$

wherein C is the electrostatic capacity (dielectric constant) of the ceramic dielectric layer, $\epsilon_0$ is the dielectric constant in vacuum equaling to $8.854 \times 10^{-12} F/m$, $\epsilon_S$ is a dielectric constant of the dielectric material, S is an overlay area coverage of the electrodes formed on both surfaces of the dielectric layer, and t is the thickness of the dielectric layer.

Therefore, the total dielectric constant (electrostatic capacity) of the multilayered capacitor is:

$$C_T = \epsilon_0(\epsilon_{S1} \cdot S_1/t_1 + \epsilon_{S2} \cdot S_2/t_2 + \epsilon_{S3} \cdot S_3/t_3 + \ldots \epsilon_{Sn} \cdot S_n/t_n) \tag{2}$$

wherein each of $\epsilon_{S1}, \epsilon_{S2}, \epsilon_{S3} \ldots \epsilon_{Sn}$ is each dielectric constant of the dielectric layers in stack of the multilayered capacitor, each of $S_1, S_2, S_3 \ldots S_n$ is each of the effective overlay area coverage of the electrodes formed on both surfaces of the each layer in the multilayered capacitor, and each of $t_1, t_2, t_3 \ldots t_n$ is each of the effective thickness of each dielectric layer in the stack of the dielectric multilayered capacitor.

Using the above equation (2), the designing of the multilayered capacitor can be carried out to determine the thickness of the dielectric layers, and the overlay area coverage of the electrodes formed on the dielectric layers. Therefore, the change of the total dielectric constant (corresponding to the total electrostatic capacity of the capacitor) is depending on the product of the temperature coefficient of the dielectric constant of each layer and $S_n/t_n$. Accordingly, the change due to the temperature change of the total electrostatic capacity is depending on;

$$\lambda_1 \epsilon_{S1} \cdot S_1/t_1 + \lambda_2 \epsilon_{S2} \cdot S_2/t_2 + \lambda_3 \epsilon_{S3} \cdot S_3/t_3 + \ldots \lambda_n \epsilon_{Sn} \cdot S_n/t_n \quad (3)$$

wherein each of the temperature coefficients of the dielectric materials used in each layer is $\lambda_1, \lambda_2, \lambda_3 \ldots \lambda_n$.

If this formula (3) is zero or nearly zero, the change of the total dielectric constant due to the temperature change will be zero or nearly zero. Therefore, two or more species of the dielectric material are used for the formation of the dielectric layers in the stack of the multilayered capacitor wherein one species of the dielectric material has a positive temperature coefficient, and another species has a negative temperature coefficient of the dielectric constant λ, so as that the formula (3) should be zero or nearly zero by predetermining appropriate overlay area coverage of the electrodes and the thickness of the layers in the stack of the multilayered capacitor. Accordingly, the total temperature coefficient of the electrostatic capacity of the multilayered capacitor can be minimized or zero.

For example, the multilayered ceramic capacitor with the combination of alumina layers (films) having positive temperature coefficient of the dielectric constant, and strontium titanate layers (films) having negative temperature coefficient will be concretely described for the formation of the multilayered capacitor in which the change due to the temperature change of the electrostatic capacity thereof. The temperature coefficient of the dielectric constant of alumina is about +130 ppm/°C., and the temperature coefficient of strontium titanate is about −700 ppm/°C. In the condition of the total temperature coefficient of the dielectric constant being minimized or zero;

$$130 \times \epsilon_{S1} \cdot S_1/t_1 - 700 \times \epsilon_{S2} \cdot S_2/t_2 = 0 \quad (4)$$

Then, when $$\epsilon_{S1} \cdot S_1/t_1 = 700/130 \cdot \epsilon_{S2} \cdot S_2/t_2 = 5.4 \times \epsilon_{S2} \cdot S_2/t_2,$$

the total temperature coefficient is zero.

$S_1/t_1$ and $S_2/t_2$ are determinative to the electrostatic capacity of alumina dielectric layer (film) and strontium titanate layer, and can be determined in view of the desired capacity of the multilayered capacitor. For example, in the case of producing the multilayered capacitor with 10 pF, the dielectric constants $\epsilon_{S1}$ and $\epsilon_{S2}$ are respectively about 10 and 280 for alumina and strontium titanate, and further, $\epsilon_0 = 8.854 \times 10^{-12}$ F/m. Therefore, in case of producing the multilayered capacitor of 10 pF, $$C = 10 = 8.854 \times (10 \times S_1 t_1 + 280 \times S_2/t_2) = C_1 + C_2 \quad (5)$$

In view of the formula (1) being minimized, it should be $$\epsilon_{S1} \cdot S_1/t_1 = 5.4 \times \epsilon_{S2} \cdot S_2/t_2. \quad (6)$$

Therefore, $10 \cdot S_1/t_1 = 5.4 \times 280 \cdot S_2/t_2. \quad (7)$

The dimensions of the multilayered capacitor should be determined so as to satisfy the above equations. In this condition, it should be $S_2/t_2 = 0.00063$, and accordingly, the area coverage of the electrodes formed on the alumina layers, and the thickness of the alumina layers can be determined, and further, the area coverage of the electrodes formed on the strontium titanate layers, and the thickness of the strontium titanate layers can be determined, and so the designing of the multilayered capacitor can be effected. Accordingly, in case of producing the multilayered capacitor with 10 pF, the capacity depending on the alumina layers portion of the multilayered capacitor is 8.44 pF, and the capacity depending on the strontium titanate layers portion of the multilayered capacitor is 1.56 pF.

The inventive capacitor can be used for example in a hybrid integrated circuit, and high frequency circuit.

The multi-layered ceramic capacitors of the present invention are illustrated by the following example, but should not be interpreted for the limitation of the invention.

EXAMPLE

Very thin alumina films 1 with thickness of 50 μm having positive temperature coefficient of the dielectric constant were produced by forming alumina green film pieces from an alumina paste prepared from alkoxide metal (aluminium), and firing the formed film pieces to form a very thin fired alumina film pieces fired alumina film pieces. Dielectric ceramic films 2 of the composition having strontium titanate as a major component and calcium, bismuth and the like to be substituted with thickness of 300 μm having negative temperature coefficient of the dielectric constant were produced by forming a green film pieces from a composition paste prepared from alkoxide metals, and firing the formed film pieces to form thin fired ceramic film pieces. Then, metallic conductive paste was applied to the both surfaces of the alumina films 1 and the strontium titanate composition films 2, (see FIG. 1 of the attached Drawings), by silk screen printing technique, to form electrode pattern layers which were dried and fired to produce conductive layers 3 (inner electrode) on both surfaces of the alumina films 1 and the titanate films 2. Further, a lower melting glass paste such as borosilicate glass paste was applied on both of the whole surfaces of those ceramic films including the electrode pattern layers 3 (inner electrode patterns) by a silk screen printing technique, to form glass paste layers 4 over the both surfaces of the alumina films 1 and the titanate films 2.

At least one of alumina films 1 having inner electrode(s) 3-glass paste layer(s) 4 covered, and at least one of strontium titanate films 2 having inner electrode(s) 3-glass paste layer(s) 4 covered were laminated to form a stack of alumina films 1, titanate films 2, inner electrodes 3 and glass paste layers 4 to form stacked layers as shown in FIG. 1. Further, cover alumina layers 5 having a glass paste layer only on the one surface of the cover alumina films 5 were used to cover the top surface and surface bottom of the stack to produce the laminated structure as shown in FIG. 1. The resulting laminated structure was fired under pressure in a refractory furnace at the temperature of 700° C. to 850° C. to melt the glass paste of the layers 3, thereby to join firmly the ceramic layers 1 and 2, sandwiching thereof. That is, the glass paste in the glass paste layer 3 was melt to join firmly the alumina films 1 and the titanate films 2 including inner electrodes 3 sandwiching the glass material layer 4 in the laminated structure, as shown in FIG. 1 in sectional view. So fired laminated structure was cut into individual chips of capacitors and the conventional terminal electrodes were applied or formed on the chips thereby to produce multi-layered capacitors.

Figure 2:
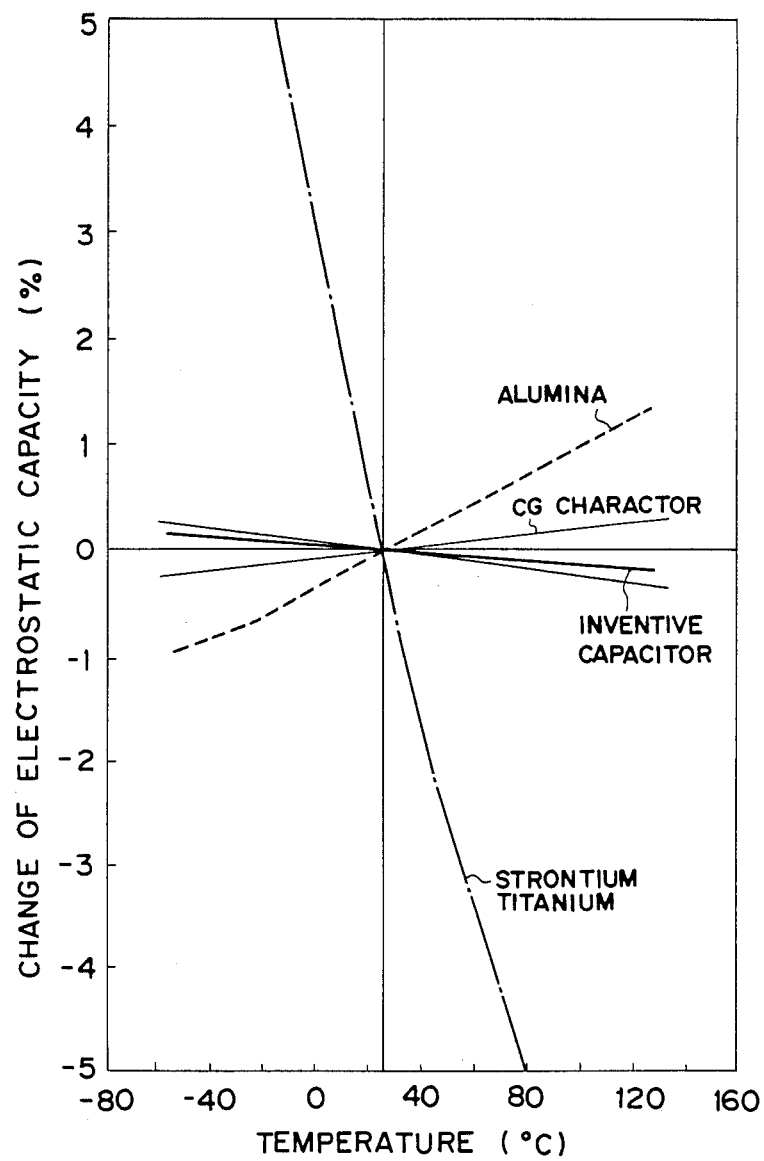
FIG. 2 is graph showing the temperature coefficient of the total electrostatic capacity of the multi-layered ceramic capacitor of the present invention in comparison with those of the mere alumina film and the mere strontium titanate film.

The electrostatic capacity of the resulting capacitor were measured, the resulting values are shown in FIG. 2. FIG. 2 is a graph representing the temperature properties (temperature coefficient) of the capacitor, in which the temperature is in abscissa, and the change of the electrostatic capacity is in ordinate.

The change of electrostatic capacity by the alumina films due to the temperature change is shown by an dotted line, in that the proportion of the dielectric constant change to the temperature (TC) is 130 ppm/°C., and therefore, is not within the range regulated by the CH character that means that TC is lower than 60 ppm/°C. (see the regulation of EIAJ: Electric Industry's Association of Japan). Further the change of electrostatic capacity by the strontium titanate films due to the temperature change is shown by a dot-dash-line, in that the proportion of the electric constant change to the temperature (TC) is in negative and steep gradient. However, the change of electrostatic capacity by the product in accordance with the present invention, to the temperature change is shown by a solid line, in that the proportion of the dielectric constant change to the temperature (TC) is within the range regulated by the CG character that means that TC is lower than 30 ppm/°C. (see the regulation of EIAJ: Electric Industry's Association of Japan).

Figure 3:
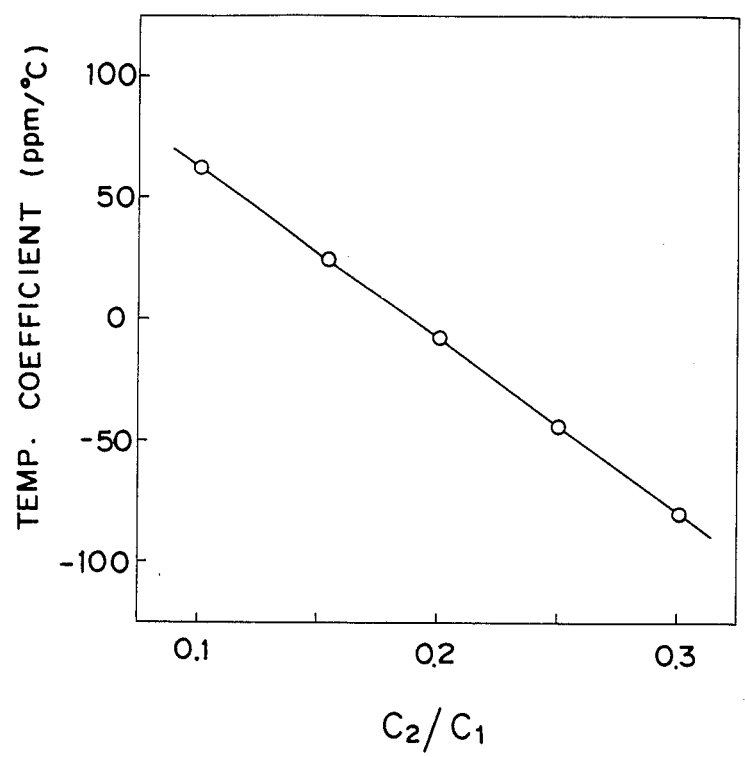
FIG. 3 is a graph showing the relation of the temperature coefficient (ppm/°C.) of the electrostatic capacity of the capacitor using the combination of the alumina film and the strontium titanate film to a ratio of $C_1$ to $C_2$ in which $C_1$ is the electrostatic capacity by the alumina film and $C_2$ is the electrostatic capacity by the strontium titanate film.

FIG. 3 shows the temperature coefficient of an electrostatic capacity against the ratio of $C_2$ to $C_1$ wherein $C_1$ is the electrostatic capacity by the alumina film with metal electrodes formed on both surfaces thereof, and $C_2$ is the electrostatic capacity by the strontium titanate film with metal electrodes formed on both surfaces thereof. It is evident that the temperature coefficient of the dielectric constant against the ratio of $C_2$ to $C_1$ will change straight downward to the right from positive value to negative value. Then, it is apparent that when the ratio of $C_2$ to $C_1$ is 0.19, the temperature coefficient of the dielectric constant is zero.

As described above, the multilayered capacitor of the present invention using the combination of the dielectric layers having positive temperature coefficient with those having negative temperature enables to control or to facilitate controlling the temperature coefficient thereof, such, for example, to minimize the temperature coefficient thereof or to make it zero.

The used glass material is boron silicate glass material which is in glass powder paste of glass powder of about 16–7 micrometer (available as Nissan Ferro 1129 from Nissan Ferro Company).

The inner electrodes as produced was prepared from silver paste which is available from Shouei No. 12995 from Shouei Chemicals. E.S.R. is an equivalent series resistance which means quality of the multilayered capacitor especially at the high frequency current.

From all of the foregoing, it will thus be evident that the present invention enables the manufacture of multi-layered capacitor with minimized or zero temperature coefficient of the dielectric constant of the ceramic multilayered capacitor.

Use of combination of two or more species of the dielectric materials compensating each other the temperature coefficient of the dielectric constant, for formation of the multilayered stack of the capacitor in accordance with the present invention will enable to minimize the change of the electrostatic capacity of the multilayered capacitor due to the temperature change.

As described in the foregoings, the formation of inner electrode (conductive layer) enclosed or bounded by glass layer and/or ceramic layer will enable use of less expensive metal material such as silver, copper and nickel as a major component making up the electrodes, in stead of costly precious metal such as palladium, and platinum. Further, the structure of the inventive multi-layered capacitor permits the choice of inner electrode material wider, and then, more appropriate electrode materials can be selected, and for example, capacitor with good high frequency characteristics can be more easily manufactured.

Use of glass materials for making a joining layer in the inventive multilayered capacitor enables the manufacture of multi-layered capacitor with excellent heat-proof, high mechanical strength, high sealing ability and high insulation between the layers.

We claim:

1. A multilayered ceramic capacitor comprising in combination:
   (a) a plurality of ceramic thin film pieces;
   (b) joining layers formed on said ceramic thin film pieces in which those are alternatively laminated therein, said ceramic thin film piece having been independently fired, and being sandwiched between two joining layers, said joining layers serving to join the adjacent layers sandwiching said joining layer; and
   (c) conductive material layers formed on the surfaces of said ceramic thin pieces for electrodes of said capacitor; wherein said plurality of ceramic film pieces comprises two or more species of ceramic films independently different in dielectric properties, each of which species is made of selected dielectric material, each species having at least one film piece laminated in the stack of the layers.

2. The capacitor as claimed in claim 1 wherein one of said selected dielectric materials have a positive temperature coefficient of electrostatic capacity, and the other thereof has a negative temperature coefficient of electrostatic capacity.

3. The capacitor as claimed in claim 2 wherein said dielectric material(s) having a positive temperature coefficient of electrostatic capacity is selected from alumina, mullite, steatite, forsterite, magnesium titanate or lead titanate, and said dielectric material(s) having a negative temperature coefficient of electrostatic capacity is selected from titania, calcium titanate or strontium titanate.

4. The capacitor as claimed in claim 1, wherein said joining layers are consisting essentially of:
   (1) said glass material layers and (2) said conductive material layers, and both of the said glass material layers and the said conductive material layers function to bind the adjacent two ceramic film pieces and further said conductive material layers are formed from conductive binder material.

5. The capacitor as claimed in claim 1 wherein said conductive material layers are enclosed between the ceramic thin film pieces and glass material layers, and are not exposed to the outside of the capacitor.

6. A method of the production of the multilayered ceramic capacitor of claim 1 which comprises:
   (A) selecting a combination of two or more materials having different dielectric constants and different temperature coefficient of electrostatic capacity to yield the appropriate total dielectric constant and approximately zero temperature coefficient of the total electrostatic capacity;

(B) preparing predetermined numbers of two or more species of dielectric layers each of which is made independently of the selected dielectric materials in combination as in the step (A), firing green sheets made of said selected dielectric materials;

(C) forming predetermined conductive patterns of thick coatings of conductive material paste on the both surfaces of said fired dielectric layers as prepared in the step (B), by printing said patterns of conductive electroding base metal paste on the surfaces of the said layers by a printing techniques such as silk screen printing;

(D) forming a glass paste material layer over each of the conductive patterns formed on the surfaces of said layers and the whole surfaces of the said dielectric layers by applying a paste consisting of glass powder and binder medium to the whole surface including the conductive patterns of said dielectric layers if desired;

(E) stacking at least one of each of such two or more species of said dielectric layers having entirely different dielectric properties, with said conductive patterns and said glass material layers, (F) further positioning respective ceramic films on both of the most top and on the bottom surfaces of the resulting stack.

(G) firing such formed stack at relatively lower temperature so as to melt the glass paste material in said glass material layers to join together the adjacent dielectric layers sandwiching the corresponding glass paste layers to provide a multilayered capacitor with enclosed inner electrodes.

7. A multilayered ceramic capacitor comprising in combination: dielectric layers and conductive layers alternatively layered therein, wherein said dielectric layers comprises two or more species of dielectric layers each made of different dielectric materials, which have been independently fired, said conductive material layer being formed on both surfaces of said dielectric layers, and said dielectric layers with the conductive layer(s) formed on the surface(s) thereof being mutually bonded by a joining layer consisting essentially of glass material.

8. The multilayered ceramic capacitor as claimed in claim 7, wherein said conductive material layer consisting essentially of silver, copper, palladium and the combination thereof.

9. A method of preparation of a multilayered ceramic capacitor of claim 7 which comprises:

(A) selecting a combination of two or more materials having different dielectric constants and different temperature coefficient of electrostatic capacity to yield appropriate total dielectric constant and approximately zero temperature coefficient of electrostatic capacity;

(B) firing dielectric material films of the selected dielectric materials as in the step (A), to prepare predetermined number of the fired ceramic thin films of the two or more species of said different materials as selected;

(C) applying conductive electroding paste consisting essentially of metal powder and binding medium on the surface(s) of said prepared films to form predetermined patterns as inner electrodes;

(D) further applying glass paste consisting essentially of glass powder and binding medium over the surface(s) of each the electroding films to form glass material layer(s) on the whole surfaces of said prepared films;

(E) stacking at least one of said two or more species of thus formed different dielectric films;

(F) heating thus formed stack comprising the fired dielectric films with the electroding enclosed in the glass material layers, at relatively lower temperature so as to melt the glass material thereby to form binding between the thus formed films.

10. The method of preparation of the multilayered ceramic capacitor, multilayered capacitor, as claimed in claim 9, wherein the electroding pattern is enclosed among the glass material layer and the ceramic film piece.

11. The method of preparation of the multilayered ceramic capacitor as claimed in claim 9, wherein the metal powder for the electroding pattern is selected from silver, copper, palladium and the combination thereof.

12. The method of preparation of the multilayered ceramic capacitor as claimed in claim 9, wherein the electroding pattern is formed by printing technique such as screen printing to form thick coating on the surface of the film pieces.

13. The method of preparation of the multilayered ceramic capacitor as claimed in claim 9, wherein the glass material layer is formed by applying the glass paste over the surfaces of the electroding patterns and the dielectric films.

14. The method of preparation of the multilayered ceramic capacitor as claimed in claim 9, wherein one species of the dielectric film is of alumina having a positive temperature coefficient of electrostatic capacity, and the other species of the dielectric film is of strontium titanate composition having a negative temperature coefficient of electrostatic capacity.

* * * * *